(No Model.)

C. S. ENOCH.
ELEVATOR HATCHWAY GATE.

No. 413,620. Patented Oct. 22, 1889.

WITNESSES:
David S. Williams
John T. Lewis

INVENTOR:
Chas. S. Enoch
By his atty

UNITED STATES PATENT OFFICE.

CHARLES S. ENOCH, OF CINCINNATI, OHIO, ASSIGNOR TO MORSE, WILLIAMS & CO.

ELEVATOR-HATCHWAY GATE.

SPECIFICATION forming part of Letters Patent No. 413,620, dated October 22, 1889.

Application filed June 17, 1889. Serial No. 314,607. (No model.)

*To all whom it may concern:*

Be it known that I, CHARLES S. ENOCH, of Cincinnati, Hamilton county, Ohio, have invented an Improvement in Gates or Bars for Elevator-Hatchways, of which the following is a specification.

My invention relates to gates or bars for elevator-hatchways; and it consists of certain improvements, which are fully set forth in the following specification and shown in the accompanying drawings, which form a part thereof.

The object of my invention is to provide an automatically-operated bar for the hatchways of elevators, which shall be normally closed when the elevator-hatchway is open, but shall be raised or opened and held open by the action of the elevator when the hatchway is closed by the elevator-platform and shall be again automatically lowered the moment the elevator is moved up or down in the shaft and the hatchway left open.

My object is also to construct a bar or guard which shall be firmly locked or held closed when the elevator-hatchway is open and cannot be pushed up or raised by the hand.

In carrying out my invention I employ a swinging bar or guard operated by a rotatable shaft the motion of which to cause the bar to rise or open is controlled by the elevator in ascending or descending the shaft.

I prefer to have no direct connection between the rotatable shaft and the bar or guard, but to pivot the latter to an upright support and provide it with a weight upon its shorter end, by which it would normally be held open. This bar is closed and held closed by means of the rotatable shaft, and when the elevator-platform ascends to the floor and thus closes the hatchway the bar or guard is released by the rotatable shaft and allowed to rise automatically, as is hereinafter more fully disclosed. I prefer this construction to that in which the bar and rotatable shaft are directly connected together, for the reason that the rising and falling of the bar are more gradual, and the bar is positively locked when closed and cannot be raised or opened by hand or without the operation of the mechanism controlled by the elevator.

Figure 1:
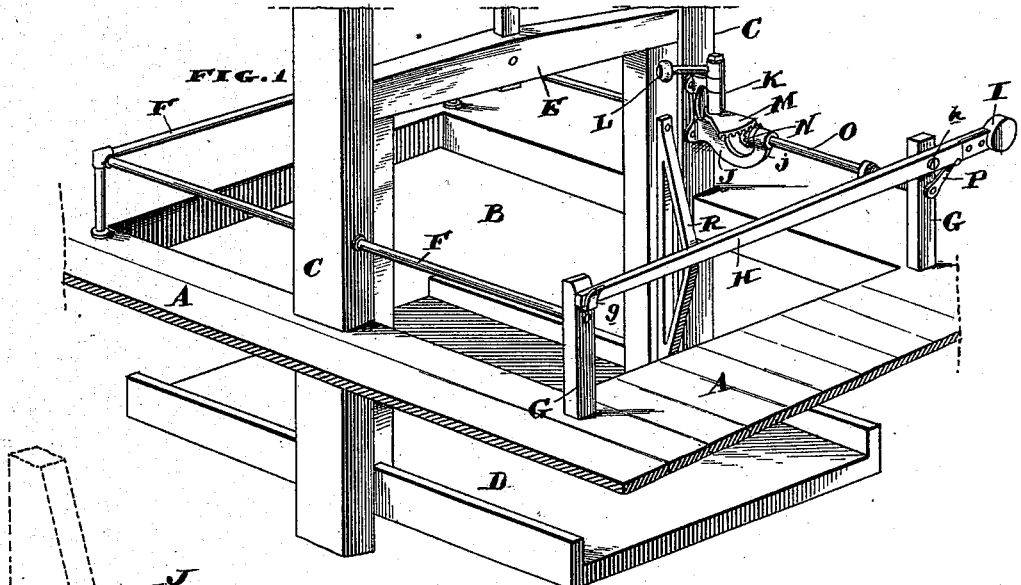
Figure 2:
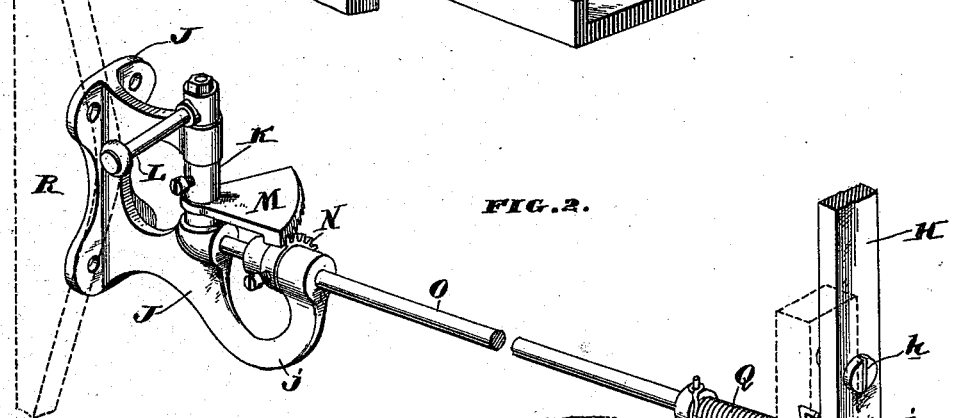
Figures 3, 4:
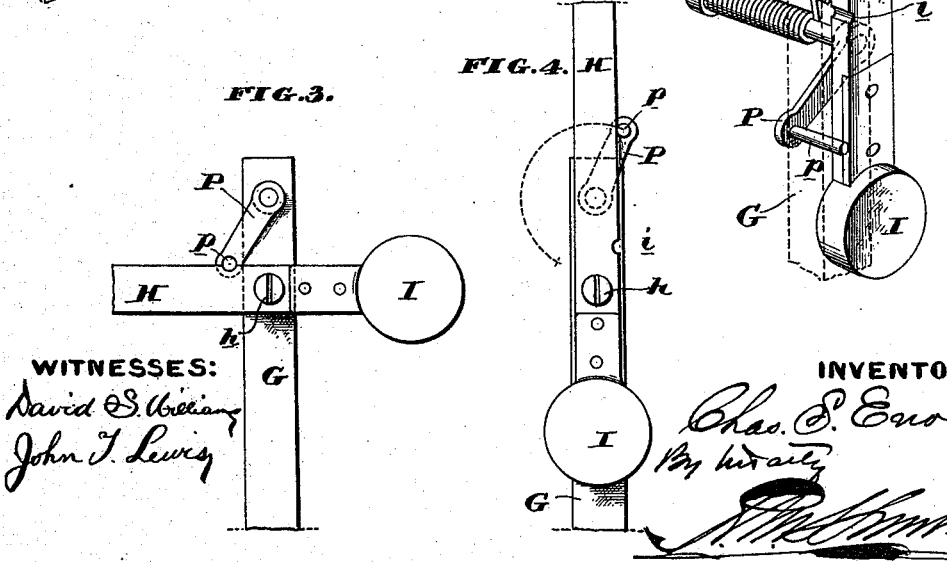

In the drawings, Figure 1 is a perspective view of an elevator and hatchway embodying the principles of my invention. Fig. 2 is a perspective view, on an enlarged scale, of the bar and mechanism for operating it, with a portion of the bar broken off. Fig. 3 is a front elevation of the bar and operating mechanism, illustrating a slight modification in the arrangement of the parts, with the bar closed; and Fig. 4 is a similar view with the bar open or raised.

A is the floor of the building.

B is the elevator-hatchway.

C C are the guideways of the elevator-shaft.

D is the platform, and E the upper framework, of the elevator.

F is a guard-railing about the hatchway upon the sides unprovided with a grate or bar.

G G are upright posts at the corners of the hatchway, to one of which the bar H is pivoted at $h$. This bar is provided with a weighted or counterbalanced end I, which normally tends to keep the bar raised or open. The bar when closed extends over to the other post or upright G, which may be provided with a support or rest $g$ for its end.

J is a bracket secured to one of the guideways C, in which is journaled a vertical rod K, carrying a laterally-extending arm L and a rack M. This rack gears with a pinion N, carried by a rod O, journaled in an extension of the bracket J and the upright post G below the pivot-point $h$. The rod O extends through the post G, and is provided on its end with a crank P, having a pin $p$ upon its end, adapted to press against the end of the bar H.

Q is the spring between the rod O and upright G, by which the rod is normally held in the position shown in Fig. 1—*i. e.*, with the bar closed and the pin $p$ of the crank P resting under the short or weighted end to hold it closed, and with the arm L extending out into the elevator-shaft.

R is a cam carried by the upright portion E of the elevator, adapted to operate the arm L and the mechanism controlled thereby. This cam is formed with a face inclining in both directions, so as to operate the arm L both when the elevator is ascending and when it is descending. The bar H may be provided with a notch $i$, in which the pin $p$ may rest.

The operation of my improved bar is as follows: While the normal tendency of the bar is to remain open, because of the counterbalance I, as shown in Fig. 2, the force of the spring Q presses the pin $p$ against this short or weighted end and raises it, lowering the other end of the bar until the parts are in the position shown in Fig. 1, with the bar closed and held closed by the crank P and its pin $p$. This is the normal relation of the parts of the apparatus. The pin $p$ acts as a brace and support, and the bar cannot be raised or opened without operating the rod O. Now, when the elevator ascends (or descends) in the elevator-shaft, the inclined face of the cam R, coming in contact with the arm L, pushes it over, and, through the action of the rack M and pinion N, the rod O is turned against the action of the spring, swinging the crank P and its pin $p$ from under the short end of the bar H and allowing it to open automatically by reason of its weighted end into the position shown in Fig. 2. So long as the elevator remains at the floor the cam R will hold the crank P and its pin out of action, and thus keep the bar raised; but as soon as it ascends or descends, so that the cam R is removed from the arm L, the spring Q will immediately turn the rod O and its crank P, and the pin of the latter will lift the short end of the bar and close the longer end, in the manner heretofore described.

In Figs. 3 and 4 is illustrated a slight modification in the arrangement of the parts, where, by reason of limited space, the weighted end of the bar must be made very short. In this construction the upright post G is made a little higher and the rod O is journaled above the pivot-point $h$ in place of below it, and the pins $p$ act upon the longer arm of the bar H to hold it down, instead of upon the shorter arm to hold it up, as in the former construction.

It is apparent that the crank P may be dispensed with, if desired, and the bar H may be directly connected to the end of the rod O, in place of being pivoted to the upright at $h$, and thus operated directly by the rack and pinion. I prefer the former construction, because the bar is firmly locked and cannot be raised by the hand, and because it opens and closes in a gradual and easy manner, and not with a sudden jerk.

The mere details of construction which are shown are preferred, but are not to be taken as limitations of the invention, as it is apparent that they may be varied in many ways without departing from the spirit of my invention. It is apparent that two of these bars may be employed, located one on each side of the hatchway.

Having now described my invention, what I claim as new, and desire to secure by Letters Patent, is—

1. A bar or guard for the hatchway of an elevator, pivoted to a support to normally assume an upright position, in combination with an arm pivoted to said support at a distance from the pivot point of the bar and normally pressing upon said bar to force it into and hold it in a lowered or closed position, and mechanism controlling said arm projecting into the path of the elevator and operated thereby to remove the pressure of said arm and allow the bar or guard to assume its normal upright position when the hatchway is closed by the elevator.

2. A bar or guard for the hatchway of an elevator, pivoted to a support to normally assume an upright position, in combination with an arm pivoted to said support at a distance from the pivot-point of the bar and normally pressing upon said bar to force it into and hold it in a lower or closed position, a spring to force said arm against the bar, and mechanism controlling said arm projecting into the path of the elevator and operated thereby to remove the pressure of said arm and allow the bar or guard to assume its normal upright position when the hatchway is closed by the elevator.

3. A bar or guard for the hatchway of an elevator-shaft, pivoted to a support and normally assuming a vertical position, in combination with a rod journaled in said support, having a locking-arm adapted to press upon said bar to close it and lock it in a closed position, mechanism to rotate said rod and its arm, projecting into the path of the elevator, and a cam carried by the elevator-cage to operate said projecting mechanism and unlock the bar.

4. A bar or guard for the hatchway of an elevator, pivoted to a support to normally assume an upright position, in combination with an arm pivoted to said support at a distance from the pivot-point of the bar and normally pressing upon said bar to force it into and hold it in a lowered or closed position, and mechanism controlling said arm projecting into the path of the elevator, the elevator-cage, and a cam projection carried thereby to operate said projecting mechanism to remove the pressure of said arm and allow the bar or guard to assume its normal upright position when the hatchway is closed by the elevator.

5. A bar or guard for the hatchway of an elevator-shaft, pivoted to a support to normally assume an upright position, in combination with a crank-arm journaled in said support and adapted to press upon said bar to force it into and hold it in a lowered or closed position, an extension positively connected with said crank-arm, a spring to normally force said crank-arm against the bar, and mechanism controlled by the elevator adapted to operate said extension of the crank-arm against the action of the spring to release the guard and allow it to rise or open.

6. A bar or guard for the hatchway of an elevator-shaft, pivoted to a support and normally assuming a vertical position, in combination with a rod journaled in said support, having a locking-arm adapted to press upon said bar to close it and lock it in a closed position, mechanism to rotate said rod and its arm, projecting into the path of the elevator, a cam carried by the elevator-cage to operate said projecting mechanism and unlock the bar, and a spring carried by said rod to force its arm upon the bar and close and relock it after the elevator has passed the hatchway.

7. A bar or guard for the hatchway of an elevator-shaft, pivoted to a support to normally assume an upright position, in combination with a crank-arm journaled in said support and adapted to press upon said bar to force it into and hold it in a lowered or closed position, an extension connected with said crank-arm, a spring to normally force said crank against the bar, a pinion carried by said extension, a projection in the path of the elevator, a rack connected with said projection and gearing with the pinion, and a cam device carried by the elevator adapted to push said projection to operate the crank-arm and permit the bar or guard to rise and assume its normal or opened position.

In testimony of which invention I have hereunto set my hand.

CHARLES S. ENOCH.

Witnesses:
ERNEST HOWARD HUNTER,
S. T. YERKES.